(12) United States Patent
Cross, Jr.

(10) Patent No.: US 8,843,376 B2
(45) Date of Patent: Sep. 23, 2014

(54) SPEECH-ENABLED WEB CONTENT SEARCHING USING A MULTIMODAL BROWSER

(75) Inventor: Charles W. Cross, Jr., Wellington, FL (US)

(73) Assignee: Nuance Communications, Inc., Burlington, MA (US)

( * ) Notice: Subject to any disclaimer, the term of this patent is extended or adjusted under 35 U.S.C. 154(b) by 1149 days.

(21) Appl. No.: 11/685,350

(22) Filed: Mar. 13, 2007

(65) Prior Publication Data

US 2008/0228494 A1  Sep. 18, 2008

(51) Int. Cl.
  *G10L 15/22* (2006.01)
  *G10L 15/00* (2013.01)
  *G06F 17/30* (2006.01)

(52) U.S. Cl.
  CPC .......... *G06F 17/30899* (2013.01); *G10L 15/22* (2013.01)
  USPC .......................................... 704/275; 704/270

(58) Field of Classification Search
  CPC ....... G10L 15/00; G10L 15/183; G10L 15/19; G10L 15/193; G10L 15/197
  USPC ...................... 704/270, 270.1, 275
  See application file for complete search history.

(56) References Cited

U.S. PATENT DOCUMENTS

| | | | |
|---|---|---|---|
| 5,097,528 A | 3/1992 | Gursahaney et al. |
| 5,577,165 A | 11/1996 | Takebayashi et al. |
| 5,584,052 A | 12/1996 | Gulau et al. |
| 5,646,979 A | 7/1997 | Knuth |
| 5,689,547 A | 11/1997 | Molne |
| 5,884,262 A | 3/1999 | Wise et al. |
| 5,953,392 A | 9/1999 | Rhie et al. |
| 5,969,717 A | 10/1999 | Ikemoto |
| 5,991,615 A | 11/1999 | Coppinger et al. |
| 6,028,601 A | 2/2000 | Machiraju et al. |
| 6,031,467 A | 2/2000 | Hymel et al. |
| 6,084,583 A | 7/2000 | Gerszberg et al. |
| 6,101,472 A | 8/2000 | Giangarra et al. |

(Continued)

FOREIGN PATENT DOCUMENTS

| | | |
|---|---|---|
| CN | 1385783 | 12/2002 |
| CN | 1385783 A | 12/2002 |

(Continued)

OTHER PUBLICATIONS

U.S. Appl. No. 10/919,005, filed Dec. 2005, Eichenberger, et al.

(Continued)

*Primary Examiner* — Jialong He
(74) *Attorney, Agent, or Firm* — Wolf, Greenfield & Sacks, P.C.

(57) ABSTRACT

Speech-enabled web content searching using a multimodal browser implemented with one or more grammars in an automatic speech recognition ('ASR') engine, with the multimodal browser operating on a multimodal device supporting multiple modes of interaction including a voice mode and one or more non-voice modes, the multimodal browser operatively coupled to the ASR engine, includes: rendering, by the multimodal browser, web content; searching, by the multimodal browser, the web content for a search phrase, including yielding a matched search result, the search phrase specified by a first voice utterance received from a user and a search grammar; and performing, by the multimodal browser, an action in dependence upon the matched search result, the action specified by a second voice utterance received from the user and an action grammar.

20 Claims, 6 Drawing Sheets

(56) References Cited

U.S. PATENT DOCUMENTS

| | | |
|---|---|---|
| 6,128,651 A | 10/2000 | Cezar |
| 6,141,010 A | 10/2000 | Hoyle |
| 6,157,841 A | 12/2000 | Bolduc et al. |
| 6,208,972 B1 | 3/2001 | Grant et al. |
| 6,212,545 B1 | 4/2001 | Ohtani et al. |
| 6,243,375 B1 | 6/2001 | Speicher |
| 6,243,443 B1 | 6/2001 | Low et al. |
| 6,275,806 B1 | 8/2001 | Pertrushin |
| 6,285,862 B1 | 9/2001 | Ruhl et al. |
| 6,298,218 B1 | 10/2001 | Lowe et al. |
| 6,301,560 B1 | 10/2001 | Masters |
| 6,321,209 B1 | 11/2001 | Pasquali |
| 6,332,127 B1 | 12/2001 | Bandera et al. |
| 6,381,465 B1 | 4/2002 | Chern et al. |
| 6,393,296 B1 | 5/2002 | Sabnani et al. |
| 6,397,057 B1 | 5/2002 | Malackowski et al. |
| 6,400,806 B1 | 6/2002 | Uppaluru |
| 6,401,085 B1 | 6/2002 | Gershman et al. |
| 6,405,123 B1 | 6/2002 | Rennard et al. |
| 6,452,498 B2 | 9/2002 | Stewart |
| 6,484,148 B1 | 11/2002 | Boyd |
| 6,513,011 B1 | 1/2003 | Uwakubo |
| 6,529,159 B1 | 3/2003 | Fan et al. |
| 6,552,682 B1 | 4/2003 | Fan |
| 6,560,456 B1 | 5/2003 | Lohtia et al. |
| 6,594,347 B1 | 7/2003 | Calder et al. |
| 6,600,736 B1 | 7/2003 | Ball et al. |
| 6,601,026 B2 | 7/2003 | Appelt et al. |
| 6,606,599 B2 | 8/2003 | Grant et al. |
| 6,606,611 B1 | 8/2003 | Khan et al. |
| 6,608,556 B2 | 8/2003 | DeMoerloose et al. |
| 6,636,733 B1 | 10/2003 | Helferich |
| 6,647,269 B2 | 11/2003 | Hendrey et al. |
| 6,658,389 B1 | 12/2003 | Alpdemir |
| 6,664,922 B1 | 12/2003 | Fan |
| 6,701,162 B1 | 3/2004 | Everett |
| 6,769,010 B1 | 7/2004 | Knapp et al. |
| 6,772,213 B2 | 8/2004 | Glorikian |
| 6,789,077 B1 | 9/2004 | Slaughter et al. |
| 6,813,501 B2 | 11/2004 | Kinnunen et al. |
| 6,823,257 B2 | 11/2004 | Clapper |
| 6,826,614 B1 | 11/2004 | Hanmann et al. |
| 6,842,767 B1 | 1/2005 | Partovi et al. |
| 6,856,960 B1 | 2/2005 | Dragosh |
| 6,862,445 B1 | 3/2005 | Cohen |
| 6,885,736 B2 | 4/2005 | Uppaluru |
| 6,895,084 B1 | 5/2005 | Saylor et al. |
| 6,912,400 B1 | 6/2005 | Olsson et al. |
| 6,920,425 B1 | 7/2005 | Will et al. |
| 6,941,273 B1 | 9/2005 | Loghmani et al. |
| 6,965,864 B1 | 11/2005 | Thrift et al. |
| 6,973,429 B2 | 12/2005 | Smith |
| 6,978,136 B2 | 12/2005 | Jenniges et al. |
| 6,980,834 B2 | 12/2005 | Gupta et al. |
| 6,999,930 B1 | 2/2006 | Roberts et al. |
| 7,007,074 B2 | 2/2006 | Radwin |
| 7,016,845 B2 | 3/2006 | Vora et al. |
| 7,020,609 B2 | 3/2006 | Thrift et al. |
| 7,028,306 B2 | 4/2006 | Boloker et al. |
| 7,035,805 B1 | 4/2006 | Miller |
| 7,103,349 B2 | 9/2006 | Himanen et al. |
| 7,113,911 B2 | 9/2006 | Hinde et al. |
| 7,116,976 B2 | 10/2006 | Thomas et al. |
| 7,116,985 B2 | 10/2006 | Wilson et al. |
| 7,136,634 B1 | 11/2006 | Rissanen et al. |
| 7,136,846 B2 | 11/2006 | Chang et al. |
| 7,137,126 B1 | 11/2006 | Coffman et al. |
| 7,162,365 B2 | 1/2007 | Clapper |
| 7,171,243 B2 | 1/2007 | Watanabe et al. |
| 7,188,067 B2 | 3/2007 | Grant et al. |
| 7,203,721 B1 | 4/2007 | Ben-Efraim et al. |
| 7,210,098 B2 | 4/2007 | Sibal et al. |
| 7,212,971 B2 | 5/2007 | Jost et al |
| 7,231,025 B2 | 6/2007 | Labaton |
| 7,257,575 B1 | 8/2007 | Johnston et al. |
| 7,283,850 B2 | 10/2007 | Granovetter et al. |
| 7,328,770 B2 | 2/2008 | Owens et al. |
| 7,330,890 B1 | 2/2008 | Partovi et al. |
| 7,346,374 B2 | 3/2008 | Witkowski et al. |
| 7,359,723 B2 | 4/2008 | Jones |
| 7,376,434 B2 | 5/2008 | Thomas et al. |
| 7,376,586 B1 | 5/2008 | Partovi et al. |
| 7,379,969 B2 | 5/2008 | Osborn, Jr. |
| 7,415,537 B1 | 8/2008 | Maes |
| 7,437,183 B2 | 10/2008 | Makinen |
| 7,457,397 B1 | 11/2008 | Saylor et al. |
| 7,477,909 B2 | 1/2009 | Roth |
| 7,487,085 B2 | 2/2009 | Cross et al. |
| 7,487,453 B2 | 2/2009 | Goebel et al. |
| 7,489,946 B2 | 2/2009 | Srinivasan et al. |
| 7,493,259 B2 | 2/2009 | Jones et al. |
| 7,493,260 B2 | 2/2009 | Harb et al. |
| 7,502,627 B2 | 3/2009 | Sacks et al. |
| 7,505,978 B2 | 3/2009 | Bodin et al. |
| 7,509,260 B2 | 3/2009 | Cross et al. |
| 7,509,659 B2 | 3/2009 | McArdle |
| 7,515,900 B2 | 4/2009 | Van Camp |
| 7,545,917 B2 | 6/2009 | Jones et al. |
| 7,551,916 B2 | 6/2009 | Gortz et al. |
| 7,564,959 B2 | 7/2009 | Greenaae et al. |
| 7,603,291 B2 | 10/2009 | Raiyani et al. |
| 7,636,426 B2 | 12/2009 | Korah et al. |
| 7,650,170 B2 | 1/2010 | May et al. |
| 7,664,649 B2 | 2/2010 | Jost et al. |
| 7,689,253 B2 | 3/2010 | Basir |
| 7,706,780 B2 | 4/2010 | Adler |
| 7,706,818 B2 | 4/2010 | Cho |
| 7,787,867 B2 | 8/2010 | Berger et al. |
| 7,801,728 B2 | 9/2010 | Ben-David et al. |
| 7,808,980 B2 | 10/2010 | Skakkebaek et al. |
| 7,809,575 B2 | 10/2010 | Ativanichayaphong et al. |
| 7,822,608 B2 | 10/2010 | Cross et al. |
| 7,827,033 B2 | 11/2010 | Ativanichayaphong et al. |
| 7,864,929 B2 | 1/2011 | Carro |
| 7,890,128 B1 | 2/2011 | Thomas et al. |
| 7,899,173 B2 | 3/2011 | Ahn et al. |
| 7,937,125 B2 | 5/2011 | May et al. |
| 7,965,196 B2 | 6/2011 | Liebermann |
| RE42,738 E | 9/2011 | Williams |
| 8,041,296 B2 | 10/2011 | Skog et al. |
| 8,046,220 B2 | 10/2011 | Argarwal et al. |
| 8,065,143 B2 | 11/2011 | Yanagihara |
| 8,073,590 B1 | 12/2011 | Zilka |
| 8,073,700 B2 | 12/2011 | Jaramillo et al. |
| 8,082,148 B2 | 12/2011 | Agapi et al. |
| 8,086,289 B2 | 12/2011 | May et al. |
| 8,103,509 B2 | 1/2012 | Burns et al. |
| 8,112,104 B1 | 2/2012 | Thomas et al. |
| 8,121,837 B2 | 2/2012 | Agapi et al. |
| 8,200,295 B2 | 6/2012 | May et al. |
| 8,203,528 B2 | 6/2012 | Spalink |
| 8,214,242 B2 | 7/2012 | Agapi et al. |
| 8,229,081 B2 | 7/2012 | Agapi et al. |
| 8,233,919 B2 | 7/2012 | Haag et al. |
| 8,243,888 B2 | 8/2012 | Cho |
| 8,260,247 B2 | 9/2012 | Lazaridis et al. |
| 8,265,659 B2 | 9/2012 | Lee |
| 8,265,862 B1 | 9/2012 | Zilka |
| 8,270,980 B2 | 9/2012 | Forssell |
| 8,280,419 B1 | 10/2012 | Thomas et al. |
| 8,280,434 B2 | 10/2012 | Garg |
| 8,285,213 B2 | 10/2012 | Skog et al. |
| 8,285,273 B2 | 10/2012 | Roth |
| 8,290,540 B2 | 10/2012 | Kittel et al. |
| 8,301,168 B2 | 10/2012 | Zubas et al. |
| 8,315,875 B2 | 11/2012 | Burns et al. |
| 8,326,328 B2 | 12/2012 | LeBeau et al. |
| 8,340,966 B2 | 12/2012 | Kerimovska et al. |
| 8,344,851 B2 | 1/2013 | Bisht |
| 8,359,020 B2 | 1/2013 | Lebeau et al. |
| 8,374,872 B2 | 2/2013 | Kesireddy |
| 8,380,516 B2 | 2/2013 | Jaramillo et al. |
| RE44,103 E | 3/2013 | Williams |
| 8,412,284 B2 | 4/2013 | Khoshaba et al. |

(56) References Cited

U.S. PATENT DOCUMENTS

| | | |
|---|---|---|
| 8,442,429 B2 | 5/2013 | Hawit |
| 8,442,447 B2 | 5/2013 | Veluppillai et al. |
| 8,447,285 B1 | 5/2013 | Bladon et al. |
| 8,447,598 B2 | 5/2013 | Chutorash et al. |
| 8,457,612 B1 | 6/2013 | Daniell |
| 8,457,963 B2 | 6/2013 | Charriere |
| 8,489,690 B2 | 7/2013 | Abuelsaad et al. |
| 8,508,379 B2 | 8/2013 | Vander Veen et al. |
| 8,526,932 B2 | 9/2013 | Tofighbakhsh et al. |
| 8,538,386 B2 | 9/2013 | May et al. |
| 8,538,491 B2 | 9/2013 | Khoshaba et al. |
| 8,549,501 B2 | 10/2013 | Eichenberger et al. |
| 8,554,254 B2 | 10/2013 | May et al. |
| 8,559,922 B2 | 10/2013 | Hardin |
| 8,565,820 B2 | 10/2013 | Riemer et al. |
| 8,571,612 B2 | 10/2013 | Gold |
| 8,577,422 B1 | 11/2013 | Ledet |
| 8,577,543 B2 | 11/2013 | Basir et al. |
| 8,583,093 B1 | 11/2013 | Bort |
| 8,583,431 B2 | 11/2013 | Furman et al. |
| 8,594,743 B2 | 11/2013 | Sano |
| 2001/0051517 A1 | 12/2001 | Strietzel |
| 2001/0053252 A1 | 12/2001 | Creque |
| 2002/0062393 A1 | 5/2002 | Borger et al. |
| 2002/0065828 A1 | 5/2002 | Goodspeed |
| 2002/0065944 A1 | 5/2002 | Hickey et al. |
| 2002/0077086 A1 | 6/2002 | Tuomela et al. |
| 2002/0087408 A1 | 7/2002 | Burnett |
| 2002/0092019 A1 | 7/2002 | Marcus |
| 2002/0095472 A1 | 7/2002 | Berkowitz et al. |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2002/0194388 A1* | 12/2002 | Boloker et al. ............... 709/310 |
| 2003/0024975 A1 | 2/2003 | Rajasekharan |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0078779 A1 | 4/2003 | Desai et al. |
| 2003/0101451 A1 | 5/2003 | Bentolila et al. |
| 2003/0125945 A1 | 7/2003 | Doyle |
| 2003/0125958 A1 | 7/2003 | Alpdemir et al. |
| 2003/0171926 A1* | 9/2003 | Suresh et al. ............... 704/270.1 |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0006478 A1 | 1/2004 | Alpdemir et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0076279 A1 | 4/2004 | Taschereau |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Ferrans et al. |
| 2004/0140989 A1 | 7/2004 | Papageorge |
| 2004/0153323 A1 | 8/2004 | Charney et al. |
| 2004/0179038 A1 | 9/2004 | Blattner et al. |
| 2004/0203766 A1 | 10/2004 | Jenniges et al. |
| 2004/0216036 A1 | 10/2004 | Chu et al. |
| 2004/0224662 A1 | 11/2004 | O'Neil et al. |
| 2004/0236574 A1 | 11/2004 | Ativanichayaphong et al. |
| 2004/0260562 A1 | 12/2004 | Kujirai |
| 2005/0004840 A1 | 1/2005 | Wanninger |
| 2005/0015256 A1 | 1/2005 | Kargman |
| 2005/0021744 A1 | 1/2005 | Haitsuka et al. |
| 2005/0033582 A1 | 2/2005 | Gadd et al. |
| 2005/0054381 A1 | 3/2005 | Lee et al. |
| 2005/0075884 A1 | 4/2005 | Badt, Jr. |
| 2005/0091059 A1 | 4/2005 | Lecoeuche |
| 2005/0131701 A1 | 6/2005 | Cross et al. |
| 2005/0138219 A1 | 6/2005 | Boughannam |
| 2005/0138562 A1 | 6/2005 | Carro |
| 2005/0138647 A1 | 6/2005 | Boughannam |
| 2005/0154580 A1 | 7/2005 | Horowitz |
| 2005/0160461 A1 | 7/2005 | Baumgartner et al. |
| 2005/0188411 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger et al. |
| 2005/0283367 A1 | 12/2005 | Cross |
| 2006/0004627 A1 | 1/2006 | Baluja |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0150119 A1 | 7/2006 | Chesnais et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0264209 A1 | 11/2006 | Atkinson et al. |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0032229 A1 | 2/2007 | Jones |
| 2007/0061146 A1* | 3/2007 | Jaramillo et al. ............. 704/270 |
| 2007/0099636 A1 | 5/2007 | Roth |
| 2007/0169143 A1 | 7/2007 | Li |
| 2007/0174244 A1 | 7/2007 | Jones |
| 2007/0174273 A1 | 7/2007 | Jones et al. |
| 2007/0174904 A1 | 7/2007 | Park |
| 2007/0185768 A1 | 8/2007 | Vengroff et al. |
| 2007/0185841 A1 | 8/2007 | Jones et al. |
| 2007/0185843 A1 | 8/2007 | Jones et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0027707 A1 | 1/2008 | Stefik et al. |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0097760 A1* | 4/2008 | Hong et al. .................. 704/251 |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |

(56) References Cited

U.S. PATENT DOCUMENTS

| | | |
|---|---|---|
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |
| 2009/0030680 A1 | 1/2009 | Mamou |
| 2009/0144428 A1 | 6/2009 | Bowater |
| 2009/0271199 A1 | 10/2009 | Agapi et al. |
| 2013/0005367 A1 | 1/2013 | Roth |
| 2013/0158994 A1 | 6/2013 | Jaramillo et al. |

FOREIGN PATENT DOCUMENTS

| | | |
|---|---|---|
| CN | 1564123 A | 1/2005 |
| EP | 0794670 A | 9/1997 |
| EP | 0 854 417 A2 | 7/1998 |
| EP | 1 143 679 A2 | 10/2001 |
| EP | 1450350 | 8/2004 |
| GB | 0507148.5 | 4/2005 |
| JP | 2000-155529 A | 6/2000 |
| JP | 2003-140672 A | 5/2003 |
| WO | WO 99/48088 | 9/1999 |
| WO | WO 0051106 A | 8/2000 |
| WO | WO 00/77978 A2 | 12/2000 |
| WO | WO 01/91488 A1 | 11/2001 |
| WO | WO 02/31814 A1 | 4/2002 |
| WO | WO 02/32140 A | 4/2002 |
| WO | WO 02/41169 A1 | 5/2002 |
| WO | WO 2004/054217 A1 | 6/2004 |
| WO | WO 2004/062945 A | 7/2004 |
| WO | WO 2005/020094 A1 | 3/2005 |
| WO | WO2006108795 | 10/2006 |
| WO | WO 2007/031447 A1 | 3/2007 |

OTHER PUBLICATIONS

U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19 2004, Charles W. Cross, Jr.
U.S. Appl. No. 10/733,610, filed Dec. 11, 2003, Charles W. Cross, Jr.
Axelsson, et al.; "XHTML+Voice Profile 1.2" Internet, [Online]Mar. 16, 2004, pp. 1-53, XP002484188 Retrieved from the Internet: URL: http://www.voicexml.org/specs/multimodal/x+v/12/spec.html [retrieved on Jun. 12, 2008].
W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].
W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].
PCT Search Report, Jun. 25, 2008; PCT Application No. PCT/EP2008/051358.
PCT Search Report, Jun. 18, 2008; PCT Application No. PCT/EP2008/051363.
Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.
Official Action dated Mar. 26, 2012 from corresponding European Application No. 08717576.6.
McCobb, "Multimodal interaction and the mobile Web, Part 1: Multimodal auto-fill," Nov. 15, 2005, pp. 1-8, http://www.ibm.com/developerworks/web/library/wi-mobweb/.
White, "Multimodal interaction and the mobile Web, Part 2: Simple searchers with Find-It," Dec. 6, 2005, pp. 1-5, http://www.ibm.com/edeveloperworks/wireless/library/wi-mobweb2/.
McCobb, "Multimodal interaction and the mobile Web, Part 3: User authentication," Jan. 10, 2006, pp. 1-6, http://www.ibm.com/developerworks/wireless/library/wi-mobweb3/.
International Search Report mailed Nov. 17, 2006 for Application No. PCT/EP2006/066037.
International Preliminary Report on Patentability and Written Opinion issued Mar. 18, 2008 for Application No. PCT/EP2006/066037.
International Search Report and Written Opinion mailed Mar. 5, 2007 for Application No. PCT/US2006/038411.
International Preliminary Report on Patentability mailed May 15, 2008 for Application No. PCT/US2006/038411.
International Search Report and Written Opinion mailed Jul. 11, 2008 for Application No. PCT/EP2008/052829 .
International Preliminary Report on Patentability mailed Sep. 24, 2009 for Application No. PCT/EP2008/052829.
Axelsson et al., "Mobile X+V 1.2," Voice XML Organization, Sep. 5, 2005, www.voicexml.org/specs/multimodal/x+v/mobile/12/>, retrieved Oct. 31, 2006.
Carmichael, "Next, Previous, Stop: Implementing an Audio Metaphor of Tape Recorder Buttons for the THISL Information Retrieval Engine Speech Interface," 2002. Available at: www.ida.liu.se/~nlplab/chi-ws-02/papers/carmichael.doc. Last accessed Jan. 13, 2014.
Dalianis et al. "SiteSeeker Voice—A speech controlled search engine," Wapalizer Paper, pp. 1-2, Feb. 25 (2003), http://www.nada.kth.se/hercules/wapalizer/SiteSeekerVoice.html> retrieved on Oct. 30, 2006.
Franz et al. "Searching the Web by Voice," International Conference on Computational Linguistics, Proceedings of Coling, XX, XX, 2002, pp. 1213-1217.
Google Short Message Service (SMS), [online] [retrieved on Sep. 29, 2005], retrieved from the Internet <URL: http://www.google.com/sms/>.
Hemphill et al. "Surfing the Web by Voice," Proceedings ACM Multimedia, Nov. 1995, pp. 215-222.
Lai et al., "Robustness in Speech Based Interfaces: Sharing the Tricks of the Trade," Proceeding CHI EA '02 CHI '02 Extended Abstracts on Human Factors in Computing Systems. 2002:915.
Nokia 616 Car Kit, [online] [retrieved on Sep. 29, 2005], retrieved from the Internet <URL: http://europe.nokia.com/nokia/065324,00.html>.
Van Tichelen, "Semantic Interpretation for Speech Recognition," W3C Working Draft, Nov. 8, 2004, www.w3.org/TR/2004/WD-semantic interpretation-20041108/, retrieved Oct. 31, 2006.
White, "Multimodal interaction and the mobile Web, Part 2: Simple searches with Find-It", (Feb. 6, 2005), http://www-128.ibm.com/developerworks/web/library/wi-mobweb2/> retrieved on Oct. 31, 2006.
Wyard et al. "Spoken Language Systems—Beyond Prompt and Response," BT Technology Journal, Springer, Dordrect, NL, vol. 14, No. 1, Jan. 1996.

* cited by examiner

SPEECH-ENABLED WEB CONTENT SEARCHING USING A MULTIMODAL BROWSER

BACKGROUND OF THE INVENTION

1. Field of the Invention

The field of the invention is data processing, or, more specifically, methods, apparatus, and products for speech-enabled web content searching using a multimodal browser.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

As smaller, handheld devices have become increasingly popular, more and more users are accessing web content through multimodal browsers that operate on these small, handheld devices. In order to aid users in finding relevant information, web pages may be designed to provide web content searching capabilities using a multimodal markup language such as X+V. Such speech-enabled searching of web content, however, is currently available only to those web pages that include speech-enabled web content, that is web content implemented using voice markup such as, for example, X+V. This drawback occurs because speech-enabled web content searching is currently implemented in the web page that contains the web content. Much of the current content on the web, however, is not speech-enabled because the web pages containing this content do not exploit the voice capabilities provided by markup languages that include voice markup such as X+V. As such, readers will appreciate that room for improvement exists in speech-enabled web content searching.

SUMMARY OF THE INVENTION

Speech-enabled web content searching using a multimodal browser implemented with one or more grammars in an automatic speech recognition ('ASR') engine, with the multimodal browser operating on a multimodal device supporting multiple modes of interaction including a voice mode and one or more non-voice modes, the multimodal browser operatively coupled to the ASR engine, includes: rendering, by the multimodal browser, web content; searching, by the multimodal browser, the web content for a search phrase, including yielding a matched search result, the search phrase specified by a first voice utterance received from a user and a search grammar; and performing, by the multimodal browser, an action in dependence upon the matched search result, the action specified by a second voice utterance received from the user and an action grammar.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
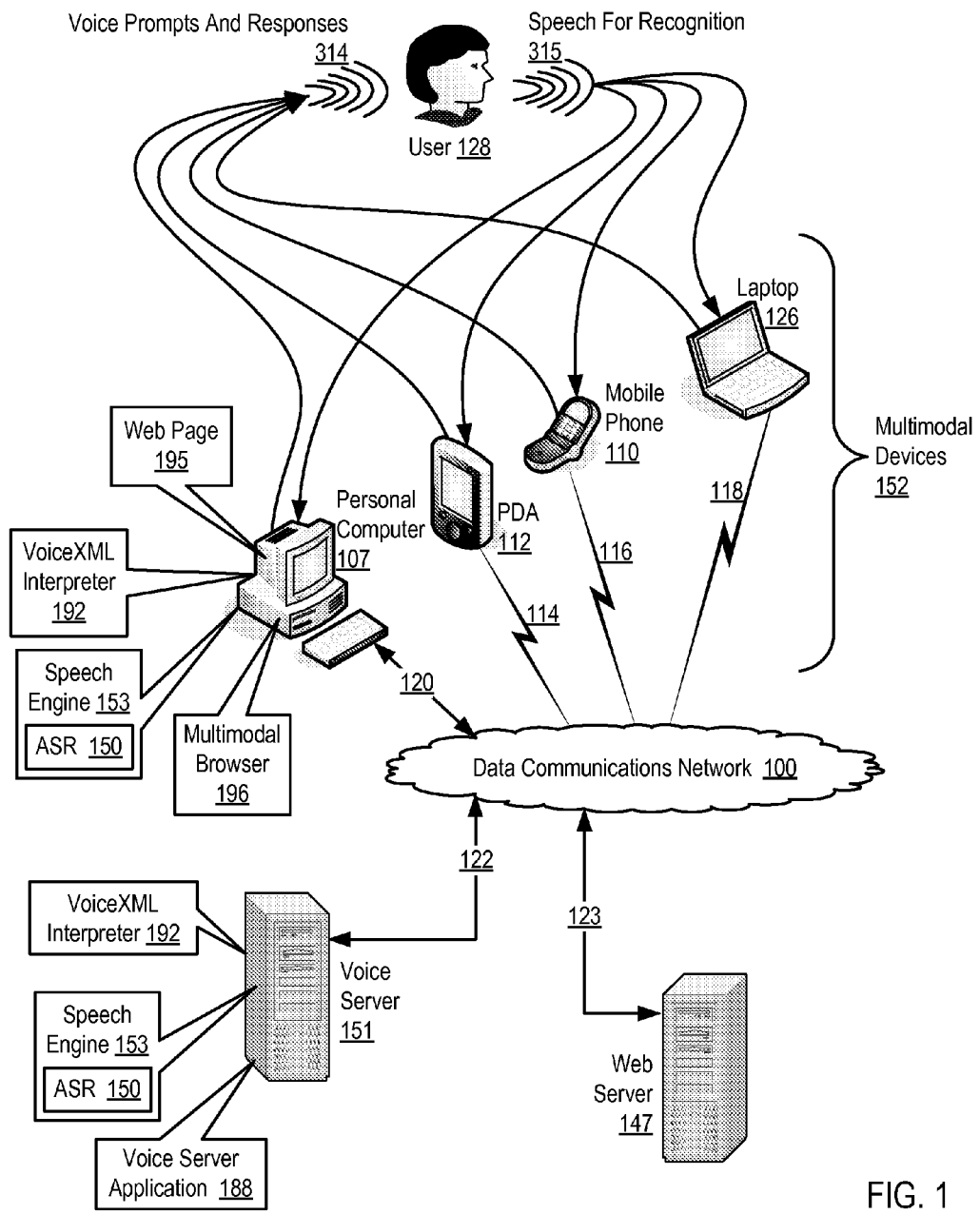
FIG. 1 sets forth a network diagram illustrating an exemplary system for speech-enabled web content searching using a multimodal browser according to embodiments of the present invention.

Exemplary methods, apparatus, and products for speech-enabled web content searching using a multimodal browser according to embodiments of the present invention are described with reference to the accompanying drawings, beginning with FIG. 1. FIG. 1 sets forth a network diagram illustrating an exemplary system for speech-enabled web content searching using a multimodal browser according to embodiments of the present invention. Speech-enabled web content searching using a multimodal browser in this example is implemented with a multimodal browser (196) operating on a multimodal device (152). The multimodal browser (196) provides an execution environment for web page (195). The web page (195) is an information resource containing web content that can be accessed through a browser. The web page (195) is implemented according to a markup language such as, for example, HyperText Markup Language ('HTML'), eXtensible Hypertext Markup Language ('XHTML'), X+V, or other markup languages as will occur to those of skill in the art. Web content is the textual, visual or aural content of the web that is presented to a user along with metadata describing such content. Web content may include, among other things, text, images, sounds, videos, and animations.

The multimodal device (152) of FIG. 1 supports multiple modes of interaction including a voice mode and one or more non-voice modes of user interaction with the multimodal application (195). The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal browser is operatively coupled to an automatic speed recognition ('ASR') engine (150). The operative coupling may be implemented with an application programming interface ('API'), a voice service module, or a VOIP connection as explained more detail below.

In the exemplary system of FIG. 1, the multimodal browser (196) includes a set of computer program instructions configured for speech-enabled web content searching according to embodiments of the present invention. The multimodal browser (196) of FIG. 1 operates generally for speech-enabled web content searching according to embodiments of the present invention by: rendering web content; searching the web content for a search phrase, including yielding a matched search result, the search phrase specified by a first voice utterance received from a user and a search grammar; and performing an action in dependence upon the matched search result, the action specified by a second voice utterance received from the user and an action grammar. Speech-enabled web content searching using a multimodal browser according to embodiments of the present invention advantageously allows a multimodal browser to provide speech-enabled search capabilities for any web content regardless of whether the web content is speech enabled. Web content is speech enabled when the author of the content implemented the web content using technologies that provide voice interaction between a human and a computer such as, for example, X+V. Web content is not speech-enabled when the author of the content implemented the web content using technologies that do not provide voice interaction between a human and a computer such as, for example, HTML.

Speech-enabled web content searching using a multimodal browser (195) is implemented with one or more grammars in the ASR engine (150). A grammar communicates to the ASR engine (150) the words and sequences of words that currently may be recognized. A grammar typically includes grammar rules that advise an ASR engine or a voice interpreter which words and word sequences presently can be recognized. Grammars for use according to embodiments of the present invention may be expressed in any format supported by an ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a VoiceXML interpreter which words presently can be recognized. In the example above, rule expansions includes conjunction and disjunction, and the vertical bars '|' mean 'or.' An ASR engine or a VoiceXML interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The exemplary grammar above is implemented using static grammar rules. Readers will note, however, that grammars useful according to embodiments of the present invention may also be implemented using dynamically defined grammar rules that are specified by the grammar as rules that are not to be processed by the ASR until after at least one static rule has been matched. Such dynamic rules are dynamically defined at run time as a new static rule in dependence upon a matched value of a previously matched static rule. The following grammar, for example:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>
``` uses a double-bracket syntax and a parameter list to specify the <<brand>> rule as a dynamic rule that is not to be processed by an ASR until after the <item> rule has been matched. In this <<brand>> example, the static <command> rule contains a rule reference:

<<brand>>(<item>)

that is specified by the grammar's double-bracket syntax to be a dynamic rule reference to the dynamic <<brand>> rule. The dynamic rule reference <<brand>> is characterized by a static rule parameter list (<item>) that includes a one static rule reference <item> specifying a static rule, here named <item>, required to be matched by the ASR engine before processing the dynamic rule <<brand>>. The parameter list (<item>) is attached to the <<brand>> rule in a manner reminiscent of the parameter list in a traditional C-style function call. In this example, there is only one entry in the parameter list, <item>, but the list could contain any number of rule references. The <command> and <item> rules are said to be 'static' rules in that they are traditional rules of a voice recognition grammar. That is, the term 'static' is used in this specification to refer to any rule of a grammar that is not a dynamic rule according to embodiments of the present invention.

The dynamic <<brand>> rule is initially defined in this example grammar only by a URL:

<<brand>>=http://groceries.com/brand.jsp

The URL identifies a computer resource capable of dynamically defining at run time the dynamic <<brand>> rule of the grammar as a new static rule in dependence upon matched value from the <item> rule, the rule required to be matched before the dynamic rule is processed. In this example, the computer resource so identified is a Java Server Page ('JSP') located at http://groceries.com. The JSP is a computer resource that is programmed to define the dynamic <<brand>> rule of the grammar as a new static rule in dependence upon matched value from the <item> rule. The ASR engine expands the definition of the <<brand>> rule with the results of the match from the <item> rule and provides the expansion to the JSP page to return a new static rule. In this way, the ASR engine may dynamically define the dynamic rule at run time as a new static rule by expanding the definition of the dynamic rule with a matched value of the referenced static <item> rule. If the <item> rule were matched with "peppers," for example, then the definition of the dynamic <<brand>> rule may be expanded as:

http://groceries.com/brand.jsp?item="peppers"

And the new static rule returned from the JSP page may be, for example:

<brand>=brand a|brand b|brand c

If the <item> rule were matched with "tomatoes," for example, then the definition of the dynamic <<brand>> rule may be expanded as:

http://groceries.com/brandjsp?item="tomatoes"

And the new static rule returned from the JSP page may be, for example:

<brand>=brand f|brand g|brand h

If the <item> rule were matched with "toothpaste," for example, then the definition of the dynamic <<brand>> rule may be expanded as:

http://groceries.com/brand.jsp?item="toothpaste"

And the new static rule returned from the JSP page may be, for example:

<brand>=colgate|palmolive|crest

And so on—with a different definition of the new static rule possible for each matched value of the referenced static <item> rule.

Note that in this example, the dynamic <<brand>> rule occurs in document order after the static <item> rule whose match value is required before the dynamic rule can be processed. In this example, the ASR engine typically will match the <item> rule in document order before processing the <<brand>> rule. This document order, however, is not a limitation of the present invention. The static and dynamic rules may occur in any document order in the grammar, and, if a dynamic rule is set forth in the grammar ahead of a static rule upon which the dynamic rule depends, then the ASR engine is configured to make more than one pass through the grammar, treating the dynamic rule in the meantime as a rule that matches any speech in the utterance until a next rule match, a next token match, or the end of processing of the pertinent user utterance.

As mentioned above, the multimodal browser (196) provides an execution environment for the web page (195). To support the multimodal browser (196) in speech-enabled web page searching, the system of FIG. 1 includes a VoiceXML interpreter (192). The VoiceXML interpreter (192) is a software module of computer program instructions that accepts voice dialog instructions from a web page or the multimodal browser itself, typically in the form of a VoiceXML <form> element. The voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA').

A multimodal device on which a multimodal browser operates is an automated device, that is, automated computing machinery or a computer program running on an automated device, that is capable of accepting from users more than one mode of input, keyboard, mouse, stylus, and so on, including speech input—and also providing more than one mode of output such as, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art.

The system of FIG. 1 includes several exemplary multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal browser capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for speech-enabled web content searching using a multimodal browser according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. The speech engine (153) of FIG. 1 is a functional module, typically a software module, although it may include specialized hardware also, that does the work of recognizing and generating or 'synthesizing' human speech. The speech engine (153) implements speech recognition by use of a further module referred to in this specification as a ASR engine (150), and the speech engine carries out speech synthesis by use of a further module referred to in this specification as a text-to-speech ('TTS') engine (not shown). As shown in FIG. 1, a speech engine (153) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal browser software that obtains speech recognition and speech synthesis services from a voice server located remotely across a network from the thin client. For ease of explanation, only one (107) of the multimodal devices (152) in the system of FIG. 1 is shown with a speech engine (153), but readers will recognize that any multimodal device may have a speech engine according to embodiments of the present invention.

The multimodal browser (196) in this example provides speech for recognition and text for speech synthesis to a speech engine through the VoiceXML interpreter (192). As shown in FIG. 1, the VoiceXML interpreter (192) may be installed locally in the multimodal device (107) itself, or the VoiceXML interpreter (192) may be installed remotely with respect to the multimodal device, across a data communications network (100) in a voice server (151). In a thick client architecture, a multimodal device (152) includes both its own speech engine (153) and its own VoiceXML interpreter (192). The VoiceXML interpreter (192) exposes an API to the multimodal browser (196) for use in providing speech recognition and speech synthesis for the multimodal browser. The multimodal browser (196) provides dialog instructions, VoiceXML <form> elements, grammars, input elements, event handlers, and so on, through the API to the VoiceXML interpreter, and the VoiceXML interpreter administers the speech engine on behalf of the multimodal browser. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal browser (196).

The VoiceXML interpreter (192) provides grammars, speech for recognition, and text prompts for speech synthesis to the speech engine (153), and the VoiceXML interpreter (192) returns to the multimodal browser speech engine (153) output in the form of recognized speech, semantic interpretation results, and digitized speech for voice prompts. In a thin client architecture, the VoiceXML interpreter (192) is located remotely from the multimodal client device in a voice server (151), the API for the VoiceXML interpreter is still implemented in the multimodal device (152), with the API modified to communicate voice dialog instructions, speech for recognition, and text and voice prompts to and from the VoiceXML interpreter on the voice server (151). For ease of explanation, only one (107) of the multimodal devices (152) in the system of FIG. 1 is shown with a VoiceXML interpreter (192), but readers will recognize that any multimodal device may have a VoiceXML interpreter according to embodiments of the present invention. Each of the example multimodal devices (152) in the system of FIG. 1 may support speech-enabled web content searching using a multimodal browser by installing and running on the multimodal device a VoiceXML interpreter that processes grammars and speech input using an ASR engine.

The use of these four example multimodal devices (152) is for explanation only, not for limitation of the invention. Any automated computing machinery capable of accepting speech from a user, providing the speech digitized to an ASR engine, and receiving and playing speech prompts and responses from the ASR engine may be improved to function as a multimodal device according to embodiments of the present invention.

The system of FIG. 1 also includes a voice server (151), which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal browsers that present web pages implemented using, for example, HTML, XHTML, or X+V.

The system of FIG. 1 includes a data communications network (100) that connects the multimodal devices (152) and the voice server (151) for data communications. A data communications network for speech-enabled web content searching using a multimodal browser according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:
  a link layer with the Ethernet™ Protocol or the Wireless Ethernet™ Protocol,
  a data communications network layer with the Internet Protocol ('IP'),
  a transport layer with the Transmission Control Protocol ('TCP') or the User Datagram Protocol ('UDP'),
  an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
  other protocols as will occur to those of skill in the art.

The system of FIG. 1 also includes a web server (147) connected for data communications through wireline connection (123) to network (100) and therefore to the multimodal devices (152). The web server (147) may be any server that provides to client devices web pages implemented according to markup language such as, for example, HTML, XHTML, or X+V. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. A multimodal browser in a multimodal device then, upon receiving from the web sever (147) a web page, may provide speech-enabled web content searching according to embodiments of the present invention using a VoiceXML interpreter (192) and speech engine (153) in the multimodal device itself or by use of a VoiceXML interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for speech-enabled web content searching using a multimodal browser according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Speech-enabled web content searching using a multimodal browser according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in speech-enabled web content searching using a multimodal browser according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server (151).

Figure 2:
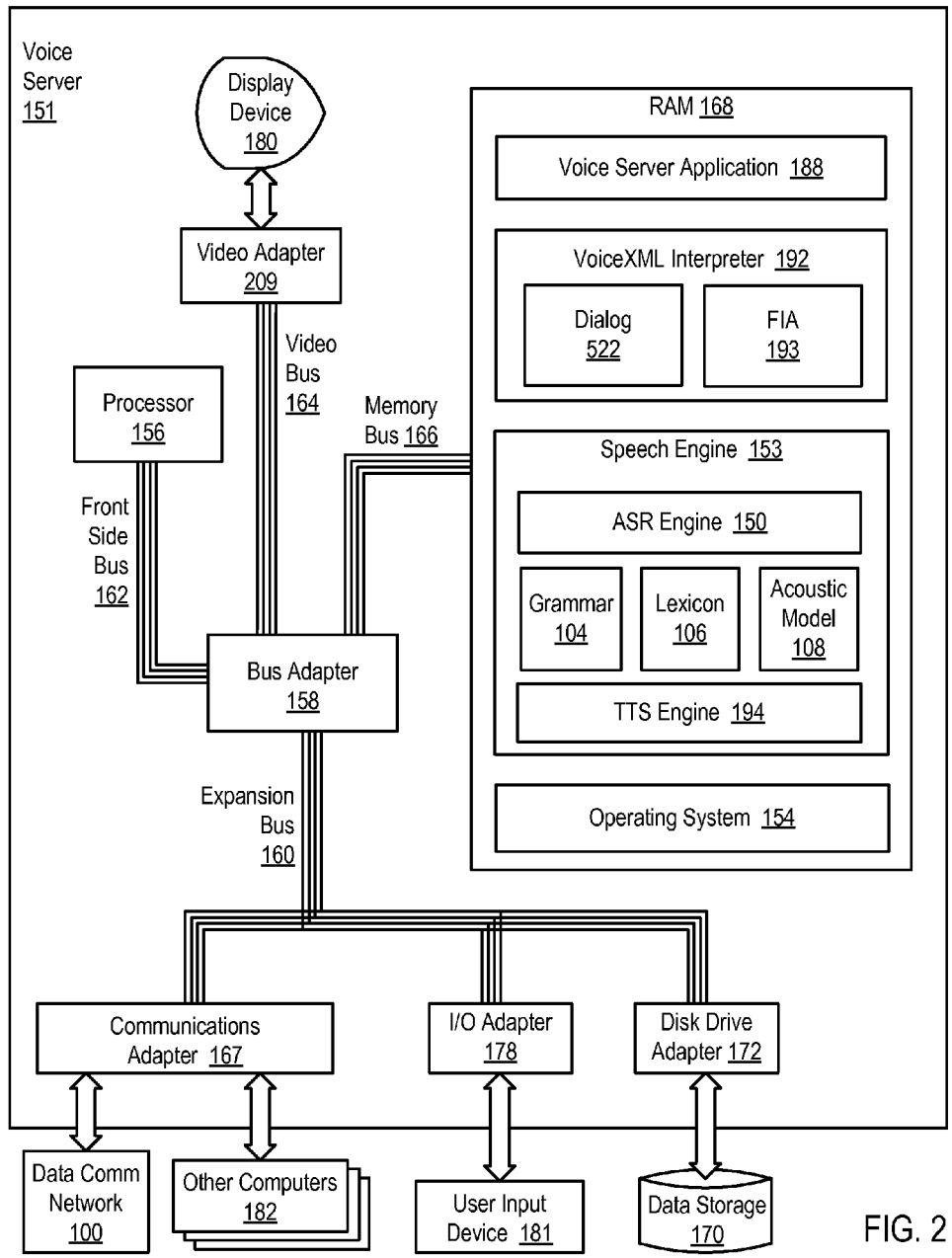
FIG. 2 sets forth a block diagram of automated computing machinery comprising an example of a computer useful as a voice server in speech-enabled web content searching using a multimodal browser according to embodiments of the present invention.

The exemplary voice server (151) of FIG. 2 is included in a system that is configured for speech-enabled web content searching using a multimodal browser according to embodiments of the present invention. Speech-enabled web content searching using a multimodal browser according to embodiments of the present invention includes: rendering, by the multimodal browser, web content; searching, by the multimodal browser, the web content for a search phrase, including yielding a matched search result, the search phrase specified by a first voice utterance received from a user and a search grammar; and performing, by the multimodal browser, an action in dependence upon the matched search result, the action specified by a second voice utterance received from the user and an action grammar.

Stored in RAM (168) is a voice server application (188), a module of computer program instructions capable of operating a voice server in a system that is configured for speech-enabled web content searching using a multimodal browser according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal browsers that provide an execution environment for web pages implemented using, for example, HTML, XHTML, or X+V. Voice server application (188) may be implemented as a web server, implemented in Java, C++, or another language, that supports speech-enabled web content searching using a multimodal browser according embodiments of the present invention.

The voice server (151) in this example includes a speech engine (153). The speech engine is a functional module, typically a software module, although it may include specialized hardware also, that does the work of recognizing and synthesizing human speech. The speech engine (153) includes an automated speech recognition ('ASR') engine (150) for speech recognition and a text-to-speech ('TTS') engine (194) for generating speech. The speech engine (153) also includes a grammar (104), a lexicon (106), and a language-specific acoustic model (108). The language-specific acoustic model (108) is a data structure, a table or database, for example, that associates Speech Feature Vectors with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out speech-enabled web content searching using a multimodal browser, the ASR engine (150) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

In the example of FIG. 2, the voice server application (188) passes the speech along to the ASR engine (150) for recognition through a VoiceXML interpreter (192). The VoiceXML interpreter (192) is a software module of computer program instructions that accepts voice dialogs (522) from a multimodal browser running remotely on a multimodal device. The dialogs (522) include dialog instructions, typically implemented in the form of a VoiceXML <form> element. The voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA') (193).

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), VoiceXML interpreter (192), speech engine (153), including ASR engine (150), and TTS engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for speech-enabled web content searching using a multimodal browser according to embodiments of the present invention include modems for wired dial-up communications, Ethernet (IEEE 802.3) adapters for wired data communications network communications, and 802.11 adapters for wireless data communications network communications.

Figure 3:
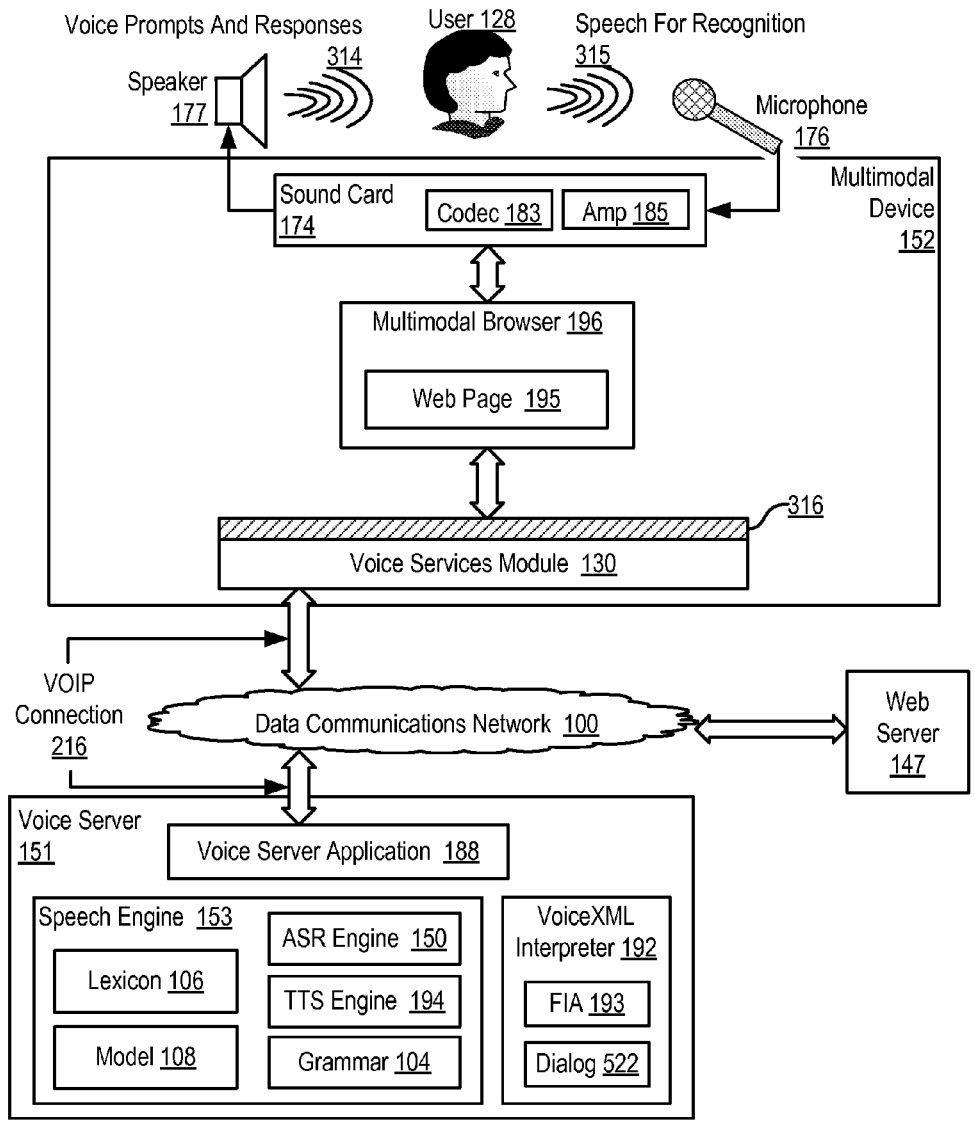
FIG. 3 sets forth a functional block diagram of exemplary apparatus for speech-enabled web content searching using a multimodal browser according to embodiments of the present invention.

For further explanation, FIG. 3 sets forth a functional block diagram of exemplary apparatus for speech-enabled web content searching using a multimodal browser in a thin client architecture according to embodiments of the present invention. The example of FIG. 3 includes a multimodal device (152) and a voice server (151) connected for data communication by a VOIP connection (216) through a data communications network (100). A web page (195) operates in a multimodal browser (196) on the multimodal device (152), and a voice server application (188) operates on the voice server (151). The web page (195) contains web content for presentation to a user and may be implemented using HTML, XHTML, or X+V.

The multimodal browser (196) of FIG. 3 includes a set of computer program instructions configured for speech-enabled web content searching according to embodiments of the present invention. The multimodal browser (196) of FIG. 3 may operate generally for speech-enabled web content searching according to embodiments of the present invention by: rendering, by the multimodal browser, web content; searching, by the multimodal browser, the web content for a search phrase, including yielding a matched search result, the search phrase specified by a first voice utterance received from a user and a search grammar; and performing, by the multimodal browser, an action in dependence upon the matched search result, the action specified by a second voice utterance received from the user and an action grammar.

The multimodal device (152) of FIG. 3 supports multiple modes of interaction including a voice mode and one or more non-voice modes. The example multimodal device (152) of FIG. 3 also supports voice with a sound card (174), which is an example of an I/O adapter specially designed for accepting analog audio signals from a microphone (176) and converting the audio analog signals to digital form for further processing by a codec (183). The example multimodal device (152) of FIG. 3 may support non-voice modes of user interaction with keyboard input, mouse clicks, a graphical user interface ('GUI'), and so on, as will occur to those of skill in the art.

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a Voice XML interpreter (192) that includes a form interpretation algorithm (193). VoiceXML interpreter (192) interprets and executes VoiceXML dialog (522) received from the multimodal browser (196) and provided to VoiceXML interpreter (192) through voice server application (188). VoiceXML input to VoiceXML interpreter (192) may originate from the multimodal browser operating on the multimodal device (152) for speech-enabled web content searching according to embodiments of the present invention. The VoiceXML interpreter (192) administers such dialogs by processing the dialog instructions sequentially in accordance with a VoiceXML Form Interpretation Algorithm ('FIA') (193).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal browser (196) is a user-level, multimodal, client-side computer program that presents a voice interface to user (128), provides audio prompts and responses (314) and accepts input speech for recognition (315). Multimodal browser (196) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). The multimodal browser (196), through an API (316) and a voice services module (130), then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts—as well as voice prompts. Voice server application (188) includes computer program instructions that provide text-to-speech ('TTS') conversion for voice prompts and voice responses to user input in multimodal browsers and that provide responses to HTTP requests from multimodal browsers running on multimodal devices.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

In the example of FIG. 3, the multimodal browser (196) is operatively coupled to the ASR engine (150) through the VoiceXML interpreter (192). In this example, the operative coupling to the ASR engine (150) through a VoiceXML interpreter (192) is implemented with a VOIP connection (216) through a voice services module (130). The voice services module is a thin layer of functionality, a module of computer program instructions, that presents an API (316) for use by an application level program in providing dialogs (522) and speech for recognition to a VoiceXML interpreter and receiving in response voice prompts and other responses, including action identifiers according to embodiments of the present invention. The VoiceXML interpreter (192), in turn, utilizes the speech engine (153) for speech recognition and generation services.

In the example of FIG. 3, the voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the web page (195) containing web content.

Figure 4:
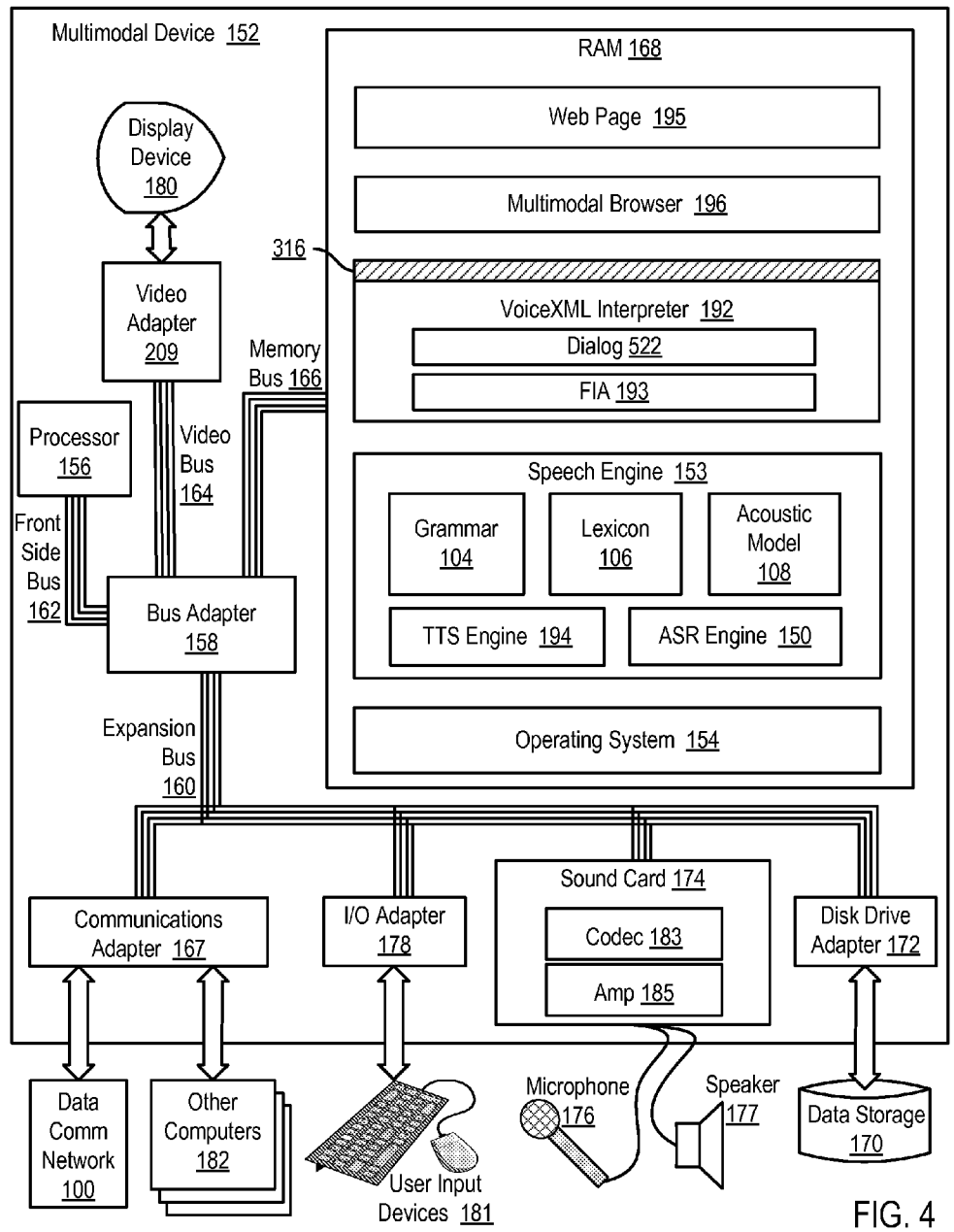
FIG. 4 sets forth a block diagram of automated computing machinery comprising an example of a computer useful as a multimodal device in speech-enabled web content searching using a multimodal browser according to embodiments of the present invention.

Speech-enabled web content searching using a multimodal browser according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in speech-enabled web content searching using a multimodal browser according to embodiments of the present invention. In a multimodal device implementing a thick client architecture as illustrated in FIG. 4, the multimodal device (152) has no connection to a remote voice server containing a VoiceXML interpreter and a speech engine. Rather, all the components needed for speech synthesis and voice recognition in speech-enabled web content searching using a multimodal browser according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), front-side bus (162), RAM (168), high speed memory bus (166), bus adapter (158), video adapter (209), video bus (164), expansion bus (160), communications adapter (167), I/O adapter (178), disk drive adapter (172), an operating system (154), a VoiceXML Interpreter (192), a speech engine (153), and so on. As in the system of FIG. 2, the speech engine in the multimodal device of FIG. 4 includes an ASR engine (150), a grammar (104), a lexicon (106), a language-dependent acoustic model (108), and a TTS engine (194). The VoiceXML interpreter (192) administers dialogs (522) by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for speech-enabled web content searching using a multimodal browser according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example are a web page (195) and a multimodal browser (196). The web page (195) contains web content implemented according to HTML, XHTML, or X+V. The multimodal browser (196) provides an execution environment for the web page (195). In the example of FIG. 4, the multimodal browser (196) includes a set of computer program instructions configured for speech-enabled web content searching according to embodiments of the present invention. The multimodal browser (196) of FIG. 4 may operate generally for speech-enabled web content searching according to embodiments of the present invention by: rendering, by the multimodal browser, web content; searching, by the multimodal browser, the web content for a search phrase, including yielding a matched search result, the search phrase specified by a first voice utterance received from a user and a search grammar; and performing, by the multimodal browser, an action in dependence upon the matched search result, the action specified by a second voice utterance received from the user and an action grammar.

The multimodal browser (196) implements speech recognition by accepting speech utterances for recognition from a user and sending the utterance for recognition through a VoiceXML interpreter API (316) to the ASR engine (150). The multimodal browser (196) implements speech synthesis generally by sending words to be used as prompts for a user to the TTS engine (194). As an example of thick client architecture, the multimodal browser (196) in this example does not send speech for recognition across a network to a voice server for recognition, and the multimodal browser (196) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal browser (196) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal browser (196) may pass VoiceXML grammars and digitized speech by calls through a VoiceXML interpreter API directly to an embedded VoiceXML interpreter (192) for processing. The embedded VoiceXML interpreter (192) may in turn issue requests for speech recognition through API calls directly to the embedded ASR engine (150). The embedded VoiceXML interpreter (192) may then issue requests to the action classifier (132) to determine an action identifier in dependence upon the recognized result provided by the ASR engine (150). The multimodal browser (196) also can provide speech synthesis, TTS conversion, by API calls to the embedded TTS engine (194) for voice prompts and voice responses to user input.

In the example of FIG. 4, the multimodal browser (196) is operatively coupled to the ASR engine (150) through a VoiceXML interpreter (192). In this example, the operative coupling through the VoiceXML interpreter is implemented using a VoiceXML interpreter API (316). The VoiceXML interpreter API (316) is a module of computer program instructions for use by an application level program in providing dialog instructions, speech for recognition, and other input to a VoiceXML interpreter and receiving in response voice prompts and other responses. The VoiceXML interpreter API presents the same application interface as is presented by the API of the voice service module (130 on FIG. 3) in a thin client architecture. At the application level, calls to the VoiceXML interpreter API may be issued from the multimodal browser (196), which provides an execution environment for the web page (195) implemented using HTML, XHTML, or X+V. The VoiceXML interpreter (192), in turn, utilizes the speech engine (153) for speech recognition and generation services.

In the example of FIG. 4, the multimodal browser (196) operates on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal browser—as well as all or most of the functionality for speech-enabled web content searching using a multimodal browser according to embodiments of the present invention—is implemented on the multimodal device itself.

Figure 5:
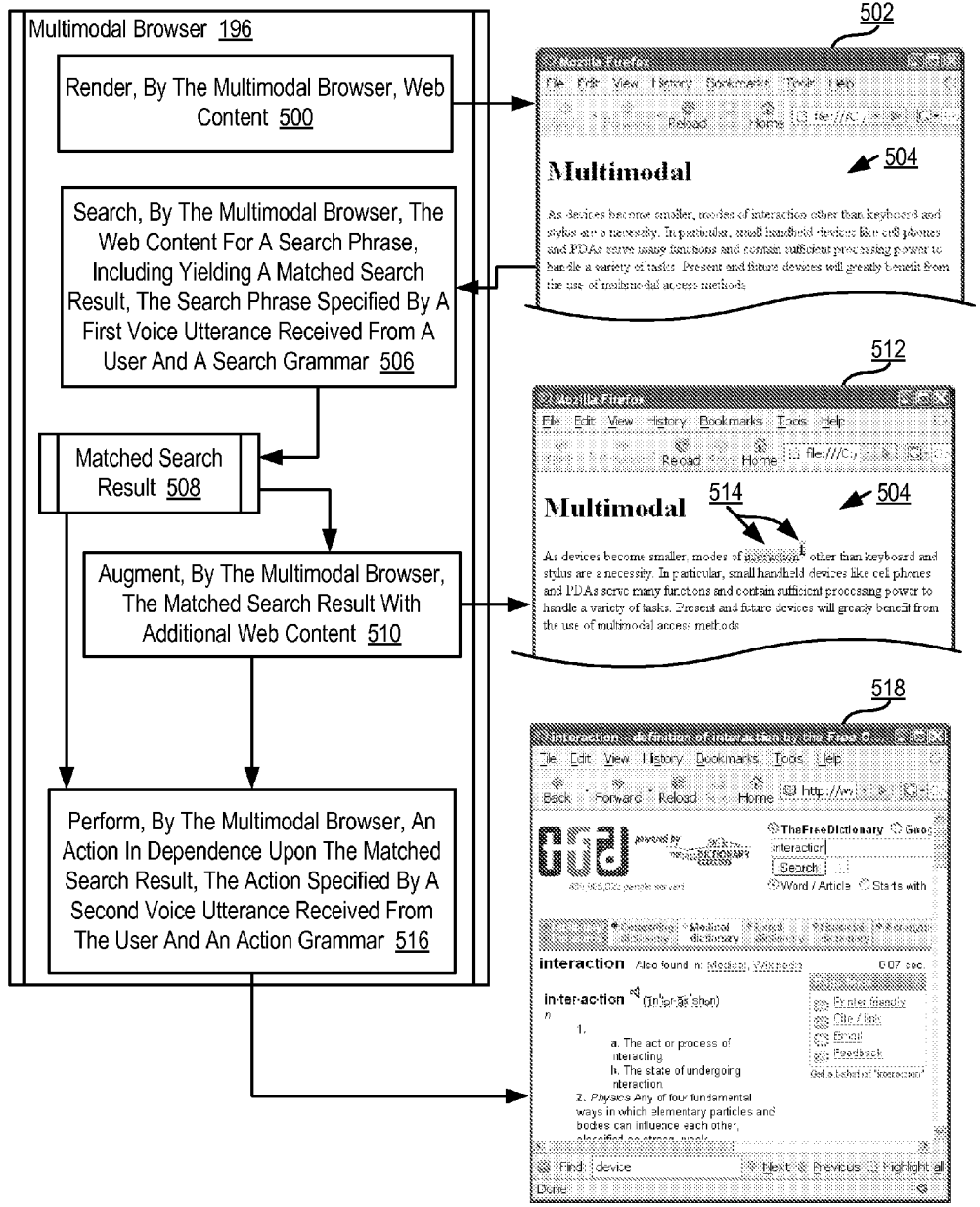
FIG. 5 sets forth a flow chart illustrating an exemplary method of speech-enabled web content searching using a multimodal browser according to embodiments of the present invention.

For further explanation, FIG. 5 sets forth a flow chart illustrating an exemplary method of speech-enabled web content searching using a multimodal browser (196) according to embodiments of the present invention. The multimodal browser (196) of FIG. 5 provides an execution environment for web pages containing web content. The multimodal browser (196) operates on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse and by user output devices such as, for example, a display screen of the multimodal device.

The method of FIG. 5 includes rendering (500), by the multimodal browser (196), web content (504). As mentioned above, web content is the textual, visual or aural content of the web that is presented to a user along with metadata describing such content. Web content may include, among other things, text, images, sounds, videos, and animations. Rendering (500), by the multimodal browser (196), web content (504) according to the method of FIG. 5 may be carried out by displaying the web content on a display screen when the web content is implemented as visual content such as, for example, textual content, graphical content, animations, and so on. Rendering (500), by the multimodal browser (196), web content (504) according to the method of FIG. 5 may be carried out by playing the web content through a speaker when the web content is implemented as aural content. In the example of FIG. 5, the web content (504) is implemented as textual content. The multimodal browser (196) of FIG. 5 renders the web content (504) on a graphical user interface ('GUI') (502) for display on the display screen of the multimodal device.

In the example of FIG. 5, the multimodal browser (196) is operatively coupled to an ASR engine, which may be implemented through a VoiceXML interpreter. The operative coupling provides a data communications path from the multimodal browser (196) to the ASR engine for grammars, speech for recognition, and other input. The operative coupling also provides a data communications path from the ASR engine to the multimodal browser (196) for recognized speech, semantic interpretation results, and other results. The operative coupling may be effected with a VoiceXML interpreter (192 on FIG. 4) when the multimodal browser is implemented in a thick client architecture. When the multimodal browser is implemented in a thin client architecture, the operative coupling may include a voice services module (130 on FIG. 3), a VOIP connection (216 on FIG. 3), and a VoiceXML interpreter (192 on FIG. 3).

Speech-enabled web content searching using a multimodal browser (196) according to the method of FIG. 5 is implemented with one or more grammars in an ASR engine. A grammar communicates to the ASR engine the words and sequences of words that currently may be recognized. A grammar typically includes grammar rules, both static and dynamic, that advise an ASR engine which words and word sequences presently can be recognized. Through the operative coupling between the multimodal browser (196) and the ASR engine, the multimodal browser (196) may provide the grammars to the ASR engine. The multimodal browser (196) may specify the grammars using the VoiceXML <grammar> elements as follows:

<grammar src="grammar.le"/>

The source attribute 'src' specifies the URI of the definition of the exemplary grammar. Although the above example illustrates how a grammar may be referenced externally, a grammar's definition may also be expressed in-line in the <grammar> element.

The method of FIG. 5 includes searching (506), by the multimodal browser (196), the web content (504) for a search phrase, including yielding a matched search result (508), the search phrase specified by a first voice utterance received from a user and a search grammar. A matched search result (508) in the example of FIG. 5 is a portion of the web content (504) that matches the search phrase specified by a first voice utterance received from a user and a search grammar. Searching (506), by the multimodal browser (196), the web content (504) for a search phrase, including yielding a matched search result (508) according to the method of FIG. 5 may be carried out by creating the search grammar in dependence upon the web content (504), receiving the first voice utterance from a user, determining, using the ASR engine, the search phrase in dependence upon the first voice utterance and the search grammar, and matching the search phrase to at least one portion of the web content (504), yielding a matched search result (508) as described in more detail below with reference to FIG. 6. In the example of FIG. 5, the matched search result (508) is the word 'interaction' in the exemplary web content (504). The word 'interaction' is specified as the matched search result (508) by the first voice utterance received from a user and the search grammar.

The method of FIG. 5 also includes augmenting (510), by the multimodal browser (196), the matched search result (508) with additional web content (514). The additional web content (514) of FIG. 5 is web content that is used to supplement the matched search result (508). In the example of FIG. 5, the additional web content (514) includes metadata used to turn the text 'interaction' into a hyperlink to the definition of 'interaction' provided by TheFreeDictionary. The additional web content (514) of FIG. 5 also includes a superscripted numeral '1' adjacent to the 'interaction' hyperlink along with metadata used to highlight the 'interaction' hyperlink and the superscripted numeral '1.' Augmenting (510), by the multimodal browser (196), the matched search result (508) with additional web content (514) according to the method of FIG. 5 may be carried out by rendering the additional web content (514) along with the web content (504). In FIG. 5, for example, the additional web content (514) is rendered along with web content (504) using GUI (512).

The method of FIG. 5 includes performing (516), by the multimodal browser, an action in dependence upon the matched search result (508), the action specified by a second voice utterance received from the user and an action grammar. An action is any action that may be performed using the matched search result (508). For example, the action may include creating a map using the matched search result (508) when the matched search result is a location, looking up more information regarding the matched search result (508) in a dictionary, encyclopedia, or other reference source available through the Internet, performing a search for the matched search result (508) through a search portal. In the example of FIG. 5, the action performed is displaying the definition of the matched search result 'interaction' provided by TheFreeDictionary using GUI (518). Performing (516), by the multimodal browser, an action in dependence upon the matched search result (508) according to the method of FIG. 5 may be carried out by creating the action grammar in dependence upon the matched search result (508), receiving the second voice utterance from the user, determining, using the ASR engine, an action identifier in dependence upon the second voice utterance and the action grammar, and performing the specified action in dependence upon the action identifier as described in more detail below with reference to FIG. 6.

Figure 6:
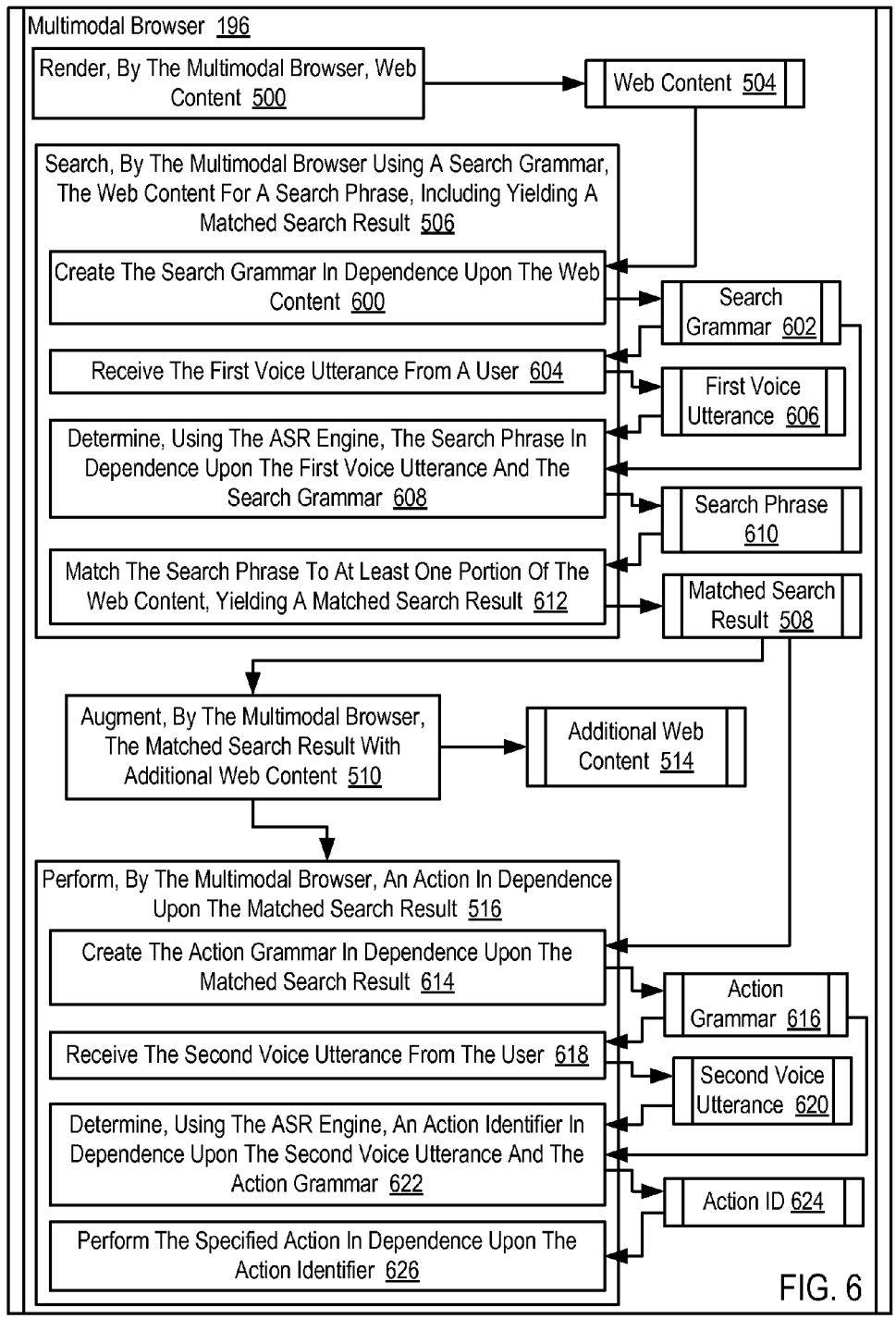
FIG. 6 sets forth a flow chart illustrating a further exemplary method of speech-enabled web content searching using a multimodal browser according to embodiments of the present invention.

For further explanation, FIG. 6 sets forth a flow chart illustrating a further exemplary method of speech-enabled web content searching using a multimodal browser (196) according to embodiments of the present invention. The multimodal browser (196) of FIG. 6 provides an execution environment for web pages containing web content. The multimodal browser (196) operates on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse and by user output devices such as, for example, a display screen of the multimodal device.

The method of FIG. 6 is similar to the method of FIG. 5. That is, the method of FIG. 6 includes: rendering (500), by the multimodal browser, web content (504); searching (506), by the multimodal browser, the web content (504) for a search phrase, including yielding a matched search result (508), the search phrase specified by a first voice utterance received from a user and a search grammar; augmenting (510), by the multimodal browser, the matched search result (508) with additional web content (514); and performing (516), by the multimodal browser, an action in dependence upon the matched search result (508), the action specified by a second voice utterance received from the user and an action grammar. In the example of FIG. 6, the multimodal browser (196) is operatively coupled to an ASR engine. Speech-enabled web content searching using a multimodal browser (196) according to embodiments of the present invention is implemented with one or more grammars in an ASR engine.

Searching (506), by the multimodal browser (196), the web content (504) for a search phrase, including yielding a matched search result (508) according to the method of FIG. 6 includes creating (600) the search grammar (602) in dependence upon the web content (504). The search grammar (602) of FIG. 6 communicates to the ASR engine the words and sequences of words that currently comprise or describe the web content (504). The multimodal browser (196) may create (600) the search grammar (602) in dependence upon the web content (504) according to the method of FIG. 6 by parsing out individual words from the web content (504), concatenating the words from the web content (504) into a single alternative list to form a grammar rule, and adding the grammar rule to a grammar template. For further explanation, consider the exemplary web content illustrated in FIG. 5 at reference numeral 504. Based on such exemplary web content, the multimodal browser (196) may create (600) the following exemplary search grammar expressed in JSGF:

```
#JSGF V1.0 iso-8859-1;
grammar textsearch;
public <textsearch> = <command> <string>{$.vSearchField = $string};
<command> = find | search [for]|show me;
<string> = <words>+;
<words> = Multimodal | As | devices| become | smaller | modes | of |
         interaction | other | than | keyboard | and | stylus | are | a |
         necessity...;
```

In the exemplary search grammar above, the grammar rule <words> is formed using an alternative list of all the words comprising the exemplary web content illustrated in FIG. 5 at reference numeral 504. The grammar rule <words> is added to a grammar template used to recognize phrases such as:
"search for devices"
"show me keyboard and stylus"
"find interaction"

In the example method of FIG. 6, searching (506), by the multimodal browser (196), the web content (504) for a search phrase, including yielding a matched search result (508) also includes receiving (604) the first voice utterance (606) from a user. The first voice utterance (606) of FIG. 6 represents digitized human speech provided to the multimodal browser (196) by a user of a multimodal device. As mentioned above, the multimodal browser (196) may receive (604) the first voice utterance (606) from a user according to the method of FIG. 6 through a microphone and encode the voice utterance in a suitable format for storage and transmission using any CODEC as will occur to those of skill in the art. In the method of FIG. 6, the multimodal browser (196) may activate receipt of the first voice utterance (606) from a user by executing a VoiceXML <form> element through a VoiceXML interpreter such as the following exemplary VoiceXML <form> element:

```
<vxml:form id="search">
    <vxml:grammar src=
    "http://www.example.com/search.grammar.jsp">
    <vxml:field name="vSearchField">
        <vxml:filled>
            <vxml:clear namelist="vSearchField"/>
            <vxml:throw event="do.search"/>
        </vxml:filled>
    </vxml:field>
</vxml:form>
```

The multimodal browser (196) may provide the exemplary VoiceXML <form> element to a VoiceXML interpreter upon rendering (500) the web content (504) to the user so as to receive any utterance provided by the user in response to the rendered web content. The exemplary VoiceXML <form> element above activates the multimodal browser (196) to receive (604) the first voice utterance (606) from a user because the VoiceXML <form> element is a dialog for presenting information and collecting data. The exemplary VoiceXML <form> element above specifies that data is to be collected in the VoiceXML field identified as "vSearchField" using a grammar specified in the VoiceXML <grammar> element. If data is successfully collected, or 'filled,' in the "vSearchField" field, then the event "do.search" is triggered, or 'thrown.' The event "do.search" specifies that the multimodal browser (196) is to perform a search of the web content (504) based on the data collected in the "vSearchField" field. The manner in which the multimodal browser (196) collects data into the "vSearchField" field and the manner in which the multimodal browser (196) search the web content are discussed in more detail below.

Searching (506), by the multimodal browser (196), the web content (504) for a search phrase, including yielding a matched search result (508) according to the method of FIG. 6 includes determining (608), using the ASR engine, the search phrase (610) in dependence upon the first voice utterance (606) and the search grammar (602). The search phrase (610) is word or set of words specified by the first voice utterance (606) received from a user and the search grammar (602). The multimodal browser (196) may determine (608) the search phrase in dependence upon the first voice utterance (606) and the search grammar (602) using the ASR engine according to the method of FIG. 6 by passing the first voice utterance (606) and the search grammar (602) to the ASR engine for speech recognition, receiving the recognition results from the ASR engine, and storing the recognition results in an ECMAScript data structure such as, for example, the application variable 'application.lastresult$' or some other field variable for a field specified in the VoiceXML <form> element generated by the multimodal browser (196) to pass the first voice utterance (606) and the search grammar (602) to the ASR engine. The multimodal browser (196) may identify the recognition results stored in an ECMAScript data structure as the search phrase (610).

In a thin client architecture, the multimodal browser (196) may provide the first voice utterance (606) and the search grammar (602) to the ASR engine as part of a call by the multimodal browser (196) to a voice services module (130 on FIG. 3) to provide voice recognition services. The voice services module, then in turn, passes the first voice utterance (606) and the search grammar (602) to the ASR engine through a VOIP connection (216 on FIG. 3) and a voice server application (188 on FIG. 3) and a VoiceXML interpreter (192 on FIG. 3). In a thick client architecture, multimodal browser (196) may provide the first voice utterance (606) and the search grammar (602) to the ASR engine as part of a call directly to an embedded VoiceXML interpreter (192 on FIG. 4) by the multimodal browser (196) through an API exposed by the VoiceXML interpreter (192 on FIG. 4). The VoiceXML interpreter, then in turn, passes the first voice utterance (606) and the search grammar (602) to the ASR engine as a part of a call to an API of the ASR engine.

As mentioned above, the multimodal browser (196) of FIG. 5 may store the recognition results from the ASR engine in an ECMAScript data structure such as, for example, the 'application.lastresult$' array. ECMAScript data structures represent objects in the Document Object Model ('DOM') at the scripting level in a web page. The DOM is a model that represents the data contained in web page in a form more readily processed by a browser and its supporting applications such as a VoiceXML interpreter. The DOM for a web page is created by the multimodal browser (196) upon loading a web page. The 'application.lastresult$' array holds information about the last recognition generated by an ASR engine for the multimodal browser (196). The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

Using the 'application.lastresult$' variable above, the multimodal browser (196) may identify the recognition results stored in 'application.lastresult$.utterance' as the search phrase (610). When the multimodal browser (196) stores the recognition results in an ECMAScript field variable for a field specified by the multimodal browser (196), the recognition results may be stored in field variable array using shadow variables similar to the application variable 'application.lastresult$.' For example, a field variable array may represent a possible recognition result through the following shadow variables:

name$[i].confidence,
name$[i].utterance,
name$[i].inputmode, and
name$[i].interpretation, where 'name$' is a placeholder for the field identifier for a field specified by multimodal browser (196) to store the recognition results. Using the exemplary VoiceXML <form> element above, the multimodal browser (196) may identify the recognition results stored in 'vSearchField$.utterance' as the search phrase (610).

In the example method of FIG. 6, searching (506), by the multimodal browser (196), the web content (504) for a search phrase, including yielding a matched search result (508) also includes matching (612) the search phrase (610) to at least one portion of the web content (504), yielding a matched search result (508). Matching (612) the search phrase (610) to at least one portion of the web content (504), yielding a matched search result (508), according to the method of FIG. 6 may be carried out by identifying a node of a DOM representing the web content that contains the search phrase (610). Identifying a node of a DOM representing the web content that contains the search phrase (610) may be carried out by calling an ECMAScript function that traverses through all the nodes of the DOM, parsing each node to determine whether the node contains the search phrase (610), and returning the identifiers for nodes that contain the search phrase (610). The matched search result (508) may be identified by the multimodal browser (196) as the text in a DOM node that matches the search phrase (610). Consider, for example, the following pseudocode of the exemplary ECMAScript function:

```
function findText(text, nodes, results)
{
    for (i in nodes)
    {
        if (typeof (nodes[i]['childNodes']) != "undefined")
        {
```

```
        findText(text, nodes.childNodes, results);
    }
    if (nodes.nodeType == node.TEXT_NODE)
        if (nodes[i].nodeValue.indexOf(text) != −1)
            results.push(nodes[i]);
    }
}.
```

The exemplary ECMAScript function 'findText' above receives parameters 'text,' 'nodes,' and 'results.' The 'text' parameter stores the search phrase (610). The 'nodes' parameter that stores the address of a list of DOM nodes that contains the web content (504). The 'results' parameter stores a pointer to a list of DOM nodes that represent the web content (504) that contains the search phrase (610). The 'findText' function above recursively traverses through each node of the DOM that represents the web content (504), determines whether each node contains the search phrase (610), and stores the identifiers for each node that contains the search phrase (610) in the 'results' list.

The multimodal browser (196) may match the search phrase (610) to at least one portion of the web content (504) using the exemplary 'findText' function above in a ECMAScript script that executes after the multimodal browser (196) determines (608) the search phrase (610). For further explanation, consider again that the exemplary VoiceXML <form> element above used to receive (604) the first voice utterance (606) from a user and to determine (608) the search phrase (610). The exemplary VoiceXML <form> element throws a 'do.search' event if the multimodal browser (196) successfully determines (608) the search phrase (610) using the search grammar (602). In response to a 'do.search' event being thrown, the following exemplary ECMAScript script may be run to execute the 'findText' function:

```
<script type="text/javascript" declare="declare" ev:event= "do.search"
ev:observer="body">
    var searchResults = new Array;
    findText(application.lastresult$, document.body.childNodes,
        searchResults);
</script>.
```

The exemplary ECMAScript script above is executed by the multimodal browser (196) when the 'do.search' event is thrown. The 'findText' function receives the search phrase (610) through the 'application.lastresult$' variable. The 'document.body.childNodes' variable represents a list of DOM nodes through which the 'findText' function traverses to identify nodes that contain the search phrase (610). The 'searchResults' variable is an array used to store the list of nodes that contain the search phrase (610). Each node listed in the 'searchResults' array, therefore, contains the matched search result (508).

In the method of FIG. 6, augmenting (510), by the multimodal browser, the matched search result (508) with additional web content (514) may be carried out by inserting the additional web content (514) into a node of a Document Object Model representing the web content (504) that contains the matched search result (508). The multimodal browser (196) may insert the additional web content (514) into a node of a DOM representing the web content (504) that contains the matched search result (508) by calling an ECMAScript function that parses the node to locate the matched search result (508) within the DOM node and appends the additional web content (514) to the matched search result (508) or inserts the additional web content (514) into the matched search result (508). Consider, for example, the following pseudocode of the exemplary ECMAScript function:

```
function augmentContent(text, results)
{
    for (i in results)
    {
        var element = results[i];
        start = element.nodeValue.indexOf(text);
        var newText = element.nodeValue.subStr(0, start−1);
        newText = newText + "<a href=\"http://www.tfd.com/" +
            text + "\" style=\"background-color: yellow\" +
            "class=\"vclick\" >";
        newText = newText + text + "</a>";
        newText = newText +
            "<b style=\"background-color: pink;" +
            "vertical-align: super\">" + i + "</b>";
        element.nodeValue = newText;
    }
}.
```

The exemplary ECMAScript function 'augmentContent' above receives parameters 'text' and 'results.' The 'text' parameter stores the search phrase (610). The 'results' parameter stores a pointer to a list of DOM nodes that represent the web content (504) that contains the search phrase (610). The 'augmentContent' function above parses the nodes in the 'results' list and appends exemplary additional web content to the matched search result (508), which is the text contained in a node of the 'results' list that matches the search phrase (610). The exemplary additional web content contained in the 'augmentContent' function above turns the matched search result (508) into a hyperlink to the definition of the matched search result (508) provided by TheFreeDictionary. The exemplary additional web content above also appends a superscripted numeral '1' to the matched search result hyperlink along with metadata used to highlight the matched search result hyperlink and the superscripted numeral '1.' When rendered by the multimodal browser (196), the exemplary additional content may resemble the additional web content on FIG. 5 at reference numeral 514. The exemplary 'augmentContent' function above operates to generate the additional web content illustrated in FIG. 5 at reference numeral 514.

The multimodal browser (196) of FIG. 6 may augment (510) the matched search result (508) using the exemplary 'augmentContent' function above in a ECMAScript script that executes after the multimodal browser (196) matches the search phrase (610) to at least one portion of the web content (504) using the exemplary 'findText.' For further explanation, consider the following exemplary ECMAScript script may be run to execute the 'augmentContent' function:

```
<script type="text/javascript" declare="declare" ev:event= "do.search"
ev:observer="body">
    var searchResults = new Array;
    findText(application.lastresult$, document.body.childNodes,
        searchResults);
    augmentContent(application.lastresult$, searchResults);
</script>.
```

The exemplary ECMAScript script above is executed by the multimodal browser (196) when the 'do.search' event is thrown. After executing the 'findText' function as described above, the multimodal browser (196) executes the 'augmentContent' function to parse the nodes in the 'searchResults' list and append additional web content to the matched search result (508) contained in the parsed nodes.

In the method of FIG. 6, performing (516), by the multimodal browser (196), an action in dependence upon the matched search result (508) includes creating (614) an action grammar (616) in dependence upon the matched search result (508). The action grammar (616) of FIG. 6 communicates to the ASR engine the words and sequences of words used by a user to perform an action based on the matched search result (508). The multimodal browser (196) may create (614) an action grammar (616) in dependence upon the matched search result (508) according to the method of FIG. 6 by adding the matched search result (508) to a grammar rule in a grammar template. For further explanation, consider an exemplary matched search result of 'interaction.' Based on the exemplary matched search result 'interaction,' the multimodal browser (196) may create (614) the following exemplary action grammar expressed in JSGF:

```
<vxml:grammar>
    <![CDATA[
        #JSGF V1.0;
        grammar search-action;
        public <search-action> = <click> | <map> | <google>;
        <click> = click [on][link|button] (<word> | <number>) {
            $="click." + $number; };
        <map> = map <word> {$="map." + $word};
        <google> = google <word> {$="google." + $word};
        <word> = interaction;
    ]]>
</vxml:grammar>
```

The exemplary action grammar above, the exemplary grammar rule <word> is formed from matched search result 'interaction' and added to a grammar template used to recognize phrases such as:
 "click interaction"
 "google interaction"
 "click on link interaction"
 "click button interaction"

The multimodal browser (196) of FIG. 6 may create (614) an action grammar (616) according to the method of FIG. 6 by calling an ECMAScript function in an ECMAScript script. The ECMAScript script may be the same script used by the multimodal browser (196) to search (506) the web content (504) for a search phrase (610) and augment (510) the matched search result (508) with additional web content (514). For further explanation, consider the following exemplary ECMAScript script:

```
<script type="text/javascript" declare="declare" ev:event= "do.search"
ev:observer="body">
    var searchResults = new Array;
    findText(application.lastresult$, document.body.childNodes,
        searchResults);
    augmentContent(application.lastresult$, searchResults);
    createActionGrammar(application.lastresult$, searchResults);
</script>
```

The exemplary ECMAScript script above is executed by the multimodal browser (196) when the 'do.search' event is thrown. After executing the 'findText' function and the 'augmentContent' function as described above, the multimodal browser (196) executes the 'createActionGrammar' function, which creates an action grammar by adding the matched search result (508) to a grammar rule in a grammar template.

Performing (516), by the multimodal browser (196), an action in dependence upon the matched search result (508) according to the method of FIG. 6 also includes receiving (618) the second voice utterance (620) from the user. The second voice utterance (620) of FIG. 6 represents digitized human speech provided to the multimodal browser (196) by a user of a multimodal device. The multimodal browser (196) may receive (618) the second voice utterance (620) from a user according to the method of FIG. 6 through a microphone and encode the voice utterance in a suitable format for storage and transmission using any CODEC as will occur to those of skill in the art.

In the method of FIG. 6, performing (516), by the multimodal browser (196), an action in dependence upon the matched search result (508) includes determining (622), using the ASR engine, an action identifier (624) in dependence upon the second voice utterance (620) and the action grammar (616). The action identifier (624) specifies the action to be performed by the multimodal browser (196). The multimodal browser (196) may determine (622) the action identifier (624) using an ASR engine according to the method of FIG. 6 by passing the second voice utterance (620) and the action grammar (616) to the ASR engine for speech recognition, receiving the recognition results from the ASR engine, and determining the action identifier (624) based on the recognized results. The multimodal browser (196) may determine the action identifier (624) based on the recognized results using semantic interpretation scripts embedded into the action grammar. In the exemplary action grammar above, for example, semantic interpretation scripts are used to produce one of the following exemplary action identifiers based on the recognition result received from the ASR engine:
 'click.1,' which specifies activating a hyperlink having the superscript '1';
 'map.interaction,' which specifies mapping the term 'interaction' using Yahoo!®;
 'google.interaction,' which specifies obtaining search results for the term 'interaction' using Google™.

The semantic interpretation scripts of the exemplary action grammar above store one of these exemplary action identifiers in the application variable:
 application.lastresult$.interpretation.search-action Performing (516), by the multimodal browser (196), an action in dependence upon the matched search result (508) according to the method of FIG. 6 includes performing (626) the specified action in dependence upon the action identifier (624). The multimodal browser (196) may perform (626) the specified action in dependence upon the action identifier (624) according to the method of FIG. 6 by triggering a VoiceXML event after determining (622) an action identifier (624) and executing a set of instructions that performs one of several actions based on the action identifier (624). The multimodal browser (196) may trigger a VoiceXML event after determining (622) an action identifier (624) by placing the action grammar (616) in a VoiceXML <link> element such as, for example, the following VoiceXML <link> element:

```
<vxml:link eventexpr=
"application.lastresult$.interpretation.search-action">
    <vxml:grammar>
        <![CDATA[
            #JSGF V1.0;
            grammar search-action-final;
            public <search-action-final> = <action>
                {$.search-action = $action;}
            <action> = <click> | <map> | <google>;
            <click> = click [on][link|button] (<word> | <number>)
                { $="click." + $number; };
            <map> = map <word> {$="map." + $word};
```

-continued

```
        <google> = google <word> {$="google." + $word};
        <word> = interaction;
    ]]>
    </vxml:grammar>
</vxml:link>
```

The exemplary VoiceXML <link> element above throws the event specified in 'eventexpr' when the action grammar is matched, thereby determining an action identifier (624) using the semantic interpretation scripts embedded in the grammar. The action identifier (624) is stored in the 'interpretation.search-action' shadow variable for the 'application.lastresult$' variable.

The multimodal browser (196) may execute a set of instructions that performs one of several actions based on the action identifier (624) by placing the set of instructions in a VoiceXML <catch> element that is processed when the VoiceXML event is triggered. Consider the following VoiceXML <catch> element:

```
<catch event="click map google">
    <vxml:if cond="__event == 'click'">
        <vxml:value expr="clickOnElement($search-
            action.substr($search-action.indexOf('.') + 1))"/>
    <vxml:elseif cond="__event == 'map'"/>
        <vxml:value
            expr="window.location('http://maps.yahoo.com/
            index.p
            hp#q1=' + $search-action.substr($search-
            results.indexOf('.') + 1)" + ')'"/>
    <vxml:elseif cond="__event == 'google'"/>
        <vxml:value
            expr="window.open('http://www.google.com/search?q
            =' + $search-action.substr($search-action.indexOf('.') +
            1) + ')'"/>
    </vxml:if>
</catch>
```

The multimodal browser (196) executes the exemplary VoiceXML <catch> element above when the 'application.lastresult$.interpretation.search-action' event is triggered and contains a value of 'click,' 'map,' or 'google.' If the 'search-action' variable contains an action identifier (624) having a value of 'click,' then the multimodal browser (196) locates the matched search result (508) represented as a hyperlink in a DOM node and actives the hyperlink using the 'clickOnElement' function. If the 'search-action' variable contains an action identifier (624) having a value of 'google,' then the multimodal browser (196) locates the matched search result (508) in a DOM node and opens a new window for obtaining web pages that contain the matched search result (508) using Google™. If the 'search-action' variable contains an action identifier (624) having a value of 'map,' then the multimodal browser (196) locates the matched search result (508) in a DOM node and changes the current document to a web page that maps the matched search result (508) using Yahoo!® maps. If the 'search-action' variable contains an action identifier (624) having a value of 'google,' then the multimodal browser (196) locates the matched search result (508) in a DOM node and opens a new window for obtaining web pages that contain the matched search result (508) using Google™.

The exemplary embodiments for speech-enabled web content searching described above are implemented using a multimodal browser. Speech-enabled web content searching using a multimodal browser advantageously allows speech-enabled searching of web content regardless of whether the web-content is speech-enabled. Such an advantage may be obtained because the speech-enabled functionality that permits web content searching according to embodiments of the present invention is implemented at the browser level through the multimodal browser itself and its supporting components such as a VoiceXML interpreter and ASR engine.

Exemplary embodiments of the present invention are described largely in the context of a fully functional computer system for speech-enabled web content searching using a multimodal browser. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of speech-enabled searching of web content using a multimodal browser, the method implemented with one or more grammars in an automatic speech recognition ('ASR') engine, with the multimodal browser operating on a multimodal device supporting multiple modes of interaction including a voice mode and one or more non-voice modes, the multimodal browser operatively coupled to the ASR engine, the method comprising:

rendering, by the multimodal browser, web content;

searching, by the multimodal browser, the rendered web content for a search phrase, including matching the search phrase to at least one portion of the rendered web content, yielding a matched search result, the search phrase specified by a first voice utterance received from a user and a search grammar; and in response to a second voice utterance received from the user:

using an action grammar comprising one or more entries to recognize the second voice utterance as corresponding to a first entry of the one or more entries, the action grammar specifying, for the first entry of the one or more entries, an associated first action to be taken in dependence upon the matched search result, and for a second entry of the one or more entries, an associated second action to be taken in dependence upon the same matched search result, the second action being different from the first action, and performing, by the multimodal browser, the first action in dependence upon the matched search result associated with the first entry.

2. The method of claim 1 wherein searching, by the multimodal browser, the web content for a search phrase, including yielding a matched search result further comprises:

creating the search grammar in dependence upon the web content;

receiving the first voice utterance from a user; and determining, using the ASR engine, the search phrase in dependence upon the first voice utterance and the search grammar.

3. The method of claim 2 wherein matching the search phrase to at least one portion of the web content, yielding a matched search result further comprises identifying a node of a Document Object Model ('DOM') representing the web content that contains the search phrase.

4. The method of claim 1 wherein performing, by the multimodal browser, an action in dependence upon the matched search result further comprises:

creating the action grammar in dependence upon the matched search result;

receiving the second voice utterance from the user;

determining, using the ASR engine, an action identifier in dependence upon the second voice utterance and the action grammar; and performing the specified action in dependence upon the action identifier.

5. The method of claim 1 further comprising augmenting, by the multimodal browser, the matched search result with additional web content.

6. The method of claim 5 wherein augmenting, by the multimodal browser, the matched search result with additional web content further comprises inserting the additional web content into a node of a Document Object Model ('DOM') representing the web content that contains the matched search result.

7. The method of claim 1 wherein the web content is not speech-enabled.

8. Apparatus for speech-enabled searching of web content using a multimodal browser operating on a multimodal device supporting multiple modes of interaction including a voice mode and one or more non-voice modes, the multimodal browser operatively coupled to an automatic speech recognition ('ASR') engine, the apparatus comprising:

a computer processor; and a computer memory operatively coupled to the computer processor, the computer memory having stored thereon computer program instructions that, when executed by the computer processor, perform a method comprising acts of:

rendering, by the multimodal browser, web content;

searching, by the multimodal browser, the rendered web content for a search phrase, including matching the search phrase to at least one portion of the rendered web content, yielding a matched search result, the search phrase specified by a first voice utterance received from a user and a search grammar; and in response to a second voice utterance received from the user:

using an action grammar comprising one or more entries to recognize the second voice utterance as corresponding to a first entry of the one or more entries, the action grammar specifying, for the first entry of the one or more entries, an associated first action to be taken in dependence upon the matched search result, and for a second entry of the one or more entries, an associated second action to be taken in dependence upon the same matched search result, the second action being different from the first action, and performing, by the multimodal browser, the first action in dependence upon the matched search result associated with the first entry.

9. The apparatus of claim 8 wherein searching, by the multimodal browser, the web content for a search phrase, including yielding a matched search result further comprises:

creating the search grammar in dependence upon the web content;

receiving the first voice utterance from a user; and determining, using the ASR engine, the search phrase in dependence upon the first voice utterance and the search grammar.

10. The apparatus of claim 9 wherein matching the search phrase to at least one portion of the web content, yielding a matched search result further comprises identifying a node of a Document Object Model ('DOM') representing the web content that contains the search phrase.

11. The apparatus of claim 8 wherein performing, by the multimodal browser, an action in dependence upon the matched search result further comprises:

creating the action grammar in dependence upon the matched search result;

receiving the second voice utterance from the user;

determining, using the ASR engine, an action identifier in dependence upon the second voice utterance and the action grammar; and performing the specified action in dependence upon the action identifier.

12. The apparatus of claim 8 further comprising computer program instructions capable of augmenting, by the multimodal browser, the matched search result with additional web content.

13. The apparatus of claim 12 wherein augmenting, by the multimodal browser, the matched search result with additional web content further comprises inserting the additional web content into a node of a Document Object Model ('DOM') representing the web content that contains the matched search result.

14. A computer-readable recordable medium encoded with instructions that, when executed, perform a method for speech-enabled searching of web content using a multimodal browser operating on a multimodal device supporting multiple modes of interaction including a voice mode and one or more non-voice modes, the multimodal browser operatively coupled to an automatic speech recognition ('ASR') engine, the method comprising acts of:

rendering, by the multimodal browser, web content;

searching, by the multimodal browser, the rendered web content for a search phrase, including matching the search phrase to at least one portion of the rendered web content, yielding a matched search result, the search phrase specified by a first voice utterance received from a user and a search grammar; and in response to a second voice utterance received from the user:

using an action grammar comprising one or more entries to recognize the second voice utterance as corresponding to a first entry of the one or more entries, the action grammar specifying, for the first entry of the one or more entries, an associated first action to be taken in dependence upon the matched search result, and for a second entry of the one or more entries, an associated second action to be taken in dependence upon the same matched search result, the second action being different from the first action, and performing, by the multimodal browser, the first action in dependence upon the matched search result associated with the first entry.

15. The computer-readable recordable medium of claim 14 wherein searching, by the multimodal browser, the web content for a search phrase, including yielding a matched search result further comprises:

creating the search grammar in dependence upon the web content;

receiving the first voice utterance from a user; and determining, using the ASR engine, the search phrase in dependence upon the first voice utterance and the search grammar.

16. The computer-readable recordable medium of claim 15 wherein matching the search phrase to at least one portion of the web content, yielding a matched search result further comprises identifying a node of a Document Object Model ('DOM') representing the web content that contains the search phrase.

17. The computer-readable recordable medium of claim 14 wherein performing, by the multimodal browser, an action in dependence upon the matched search result further comprises:

creating the action grammar in dependence upon the matched search result;

receiving the second voice utterance from the user;

determining, using the ASR engine, an action identifier in dependence upon the second voice utterance and the action grammar; and performing the specified action in dependence upon the action identifier.

18. The computer-readable recordable medium of claim 14 further comprising computer program instructions capable of augmenting, by the multimodal browser, the matched search result with additional web content.

19. The computer-readable recordable medium of claim 18 wherein augmenting, by the multimodal browser, the matched search result with additional web content further comprises inserting the additional web content into a node of a Document Object Model ('DOM') representing the web content that contains the matched search result.

20. The computer-readable recordable medium of claim 14 wherein the web content is not speech-enabled.

* * * * *